(12) United States Patent
Hinderling et al.

(10) Patent No.: US 11,585,897 B2
(45) Date of Patent: Feb. 21, 2023

(54) OPTOELECTRONIC MEASURING DEVICE HAVING SCANNING FUNCTIONALITY

(71) Applicant: HEXAGON TECHNOLOGY CENTER GMBH, Heerbrugg (CH)

(72) Inventors: Jürg Hinderling, Marbach (CH); Rainer Wohlgenannt, Klaus (AT)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 1008 days.

(21) Appl. No.: 16/359,616

(22) Filed: Mar. 20, 2019

(65) Prior Publication Data

US 2019/0293761 A1    Sep. 26, 2019

(30) Foreign Application Priority Data

Mar. 21, 2018 (EP) .................................... 18163203

(51) Int. Cl.

| G01S 7/48 | (2006.01) |
|---|---|
| G01S 7/481 | (2006.01) |
| G01S 7/484 | (2006.01) |
| G01S 17/10 | (2020.01) |
| G01S 7/486 | (2020.01) |
| G01C 15/00 | (2006.01) |
| G01S 7/487 | (2006.01) |

(Continued)

(52) U.S. Cl.
CPC .......... *G01S 7/4808* (2013.01); *G01C 15/002* (2013.01); *G01S 7/484* (2013.01); *G01S 7/487* (2013.01); *G01S 7/4817* (2013.01); *G01S 7/4868* (2013.01); *G01S 17/10* (2013.01); *G01S 17/42* (2013.01); *G01S 7/4815* (2013.01); *G01S 17/87* (2013.01)

(58) Field of Classification Search
None
See application file for complete search history.

(56) References Cited

U.S. PATENT DOCUMENTS

| 5,076,690 A | 12/1991 | deVos et al. |
|---|---|---|
| 9,638,522 B2 | 5/2017 | Zogg et al. |

(Continued)

FOREIGN PATENT DOCUMENTS

| CN | 201232146 Y | 5/2009 |
|---|---|---|
| CN | 106405527 A | 2/2017 |
| EP | 2 787 320 A1 | 10/2014 |

(Continued)

OTHER PUBLICATIONS

Extended Search Report dated Oct. 15, 2018 as recived in Application No. 18163203.5.

*Primary Examiner* — Hovhannes Baghdasaryan
(74) *Attorney, Agent, or Firm* — Maschoff Brennan

(57) ABSTRACT

An optoelectronic measuring device having scanning functionality having a pulsed radiation source for generating a measuring beam from light pulses at a light pulse emission rate, an optoelectronic detector for detecting light pulses reflected from a target object, a control and analysis unit designed for measuring a distance value from a respective scanning point of the target object according to the time-of-flight principle, based on a number n>=1 of light pulses, wherein the control and analysis unit is designed to automatically set the number (n) depending on a target-object-related measured value determined by the measuring device in real time.

12 Claims, 6 Drawing Sheets

(51) Int. Cl.
*G01S 17/42* (2006.01)
*G01S 17/87* (2020.01)

(56) References Cited

U.S. PATENT DOCUMENTS

2014/0300892 A1* 10/2014 Zogg .................... G01C 15/002
356/73
2017/0016981 A1  1/2017 Hinderling et al.

FOREIGN PATENT DOCUMENTS

EP         3 118 651 A1    1/2017
WO      2017/060947 A1    4/2017

* cited by examiner

OPTOELECTRONIC MEASURING DEVICE HAVING SCANNING FUNCTIONALITY

CROSS-REFERENCE TO RELATED APPLICATIONS

This application claims priority to European Patent Application No. 18163203 filed on Mar. 21, 2018, which is incorporated herein by reference.

FIELD OF THE INVENTION

The invention relates to an optoelectronic measuring device having scanning functionality according to the preamble of Claim 1 and an optoelectronic measuring method according to the preamble of Claim 14.

BACKGROUND

Optoelectronic measuring devices having scanning functionality, using which a position is determined based on optical radiation, are known in manifold forms. Examples are geodetic measuring devices such as total stations or multi-stations, for example total stations and laser scanners such as the Leica P20 or Leica Multistation 50, laser trackers, or profilers, which are used to measure and/or produce 3D coordinates of surfaces, or laser scanners for geodetic or industrial measuring purposes. 3D scanning is a very effective technology for producing millions of spatial measurement points of objects within minutes or seconds. Typical measuring tasks are the recording of objects such as gear wheels, wings, ships, or aircraft, and/or the surfaces thereof or objects such as industrial plants, house facades, or historical buildings, but also accident locations and crime scenes. For this purpose, they have to be capable of guiding the measuring beam of a distance measuring device over a surface and simultaneously acquiring direction and distance in relation to the measurement point. A so-called 3D point cloud is generated from the distance and the direction information correlated therewith for each point by means of data processing.

Such measuring devices have for this purpose at least one radiation source for generating optical measuring radiation, often laser radiation, and optical means such as lenses, prisms, mirrors, light-guiding fibers, or collimators, by means of which the generated measuring radiation can be emitted in free space onto a target to be measured, because of which these devices are also referred to as so-called free beam sensors. Optical measuring radiation is understood in this case as electromagnetic radiation, not only in the visible range of the spectrum, but rather also radiation in the ultraviolet, in the infrared, and in the terahertz range. Optoelectronic measuring devices are known which use measuring radiation having a wavelength of 405 nm, 532 nm, 635 nm, 650-690 nm, 780 nm or 765 nm, 795 nm, 808-850 nm, 905 nm, 980 nm, 1064 nm, or between 1500 and 1570 nm.

Furthermore, such a device has a beam deflection unit, by means of which the measuring radiation can be pivoted around at least one axis, usually two axes aligned perpendicularly to one another, for example, a vertical and horizontal axis. The beam deflector can be implemented in the form of a moving mirror or alternatively also by other elements suitable for the controlled angle deflection of optical radiation, for example, rotatable prisms, movable light guides, deformable optical components, etc.

The target to be measured is, for example, a point of a surface of a natural object. The irradiated target reflects measuring radiation in a diffuse or oriented manner, so that at least a part of the measuring radiation is reflected back to the measuring device. The measuring device has an optoelectronic sensor, which is designed for at least time-resolved detection of the measuring radiation, for example, an APD diode, an SPAD array, or an array of SPAD arrays. The desired measured variable, for example, a distance and direction value and/or a 2D/3D coordinate, is determined on the basis of the detected measuring radiation. Various measuring principles are available for this purpose, for example, a runtime measurement (time-of-flight, TOF), which determines the runtimes of individual laser pulses and therefrom from—with knowledge of the speed of light—the distance from the target object.

In this case, a plurality of surface points of the target object is sampled in succession by the pivoting, whereby, for example, an item of 3D information about the object as a whole can be obtained and/or a 3D image of the measuring environment is produced. The measurement is usually performed with determination of distance and angles, i.e., in spherical coordinates, which can also be transformed into Cartesian coordinates for display and further processing.

For rapid and accurate scanners, in particular a short measuring time is required with high measurement accuracy at the same time, for example, a distance accuracy in the millimeter range or less at measuring times of the individual points in the range of sub-microseconds to milliseconds. The measuring range extends in this case from a few centimeters up to several kilometers. The spatial measuring resolution is of particular significance in this case. It determines which details can still be recognized, but also the duration of the scanning procedure and the quantity of data arising in this case. Measuring projects using modern high-speed scanners produce 3D point clouds having a strength of, for example, several hundred million or several billion object points and above.

The accuracy of the measurement result and/or the quality of the determination of the respective distance values is substantially dependent on the signal-to-noise ratio (SNR). This is in turn decisively dependent on the detected radiant power. A high detected radiant power is advantageous to be able to delimit the measuring radiation unambiguously and sharply from the electronic and photonic noise and/or from the background radiation. The detected radiant power is often problematically weak when measuring targets having low reflectivity and/or small reflection coefficients, as many natural surfaces have. In this case, man-made structures such as concrete, asphalt, or metal are also to be understood as natural targets. For example, black target objects such as car tires are measurable only very inadequately or not at all using scanners of the prior art. On the other hand, specular reflecting targets such as metals or surfaces which are glossy in the respective wavelength range also result in low detected radiant powers away from the direction having the strongest reflection and therefore in poor measurement results.

On the other hand, elevated noise has a negative effect on the signal-to-noise ratio and thus on the measurement result. Elevated or high noise occurs above all during measurements outside, primarily due to solar radiation, which is incident directly or as ambient light diffusely on the receiving optical unit and then—for example, even in spite of an optical bandpass filter—on the detector of the measuring device. In particular when targeting and measuring bright surfaces, such as white house facades, the background radiation can be substantial, the shot noise level in the receiving unit rises and reduces the signal-to-noise ratio and thus the measurement accuracy.

Carrying out a runtime measurement not only on the basis of a single respective detected light pulse or sampled point, but rather using multiple successive or adjacent light pulses and employing them for the measurement is known from the prior art for increasing the detected power and/or improving the signal-to-noise ratio. I.e., multiple light pulses and the object points thus sampled are combined to form one scanning point.

However, this is generally performed fixedly by a fixed user-side specification for the entire scan, during which the user selects whether and to what extent such a combination occurs. Before a scanning procedure, the user sets a quality factor in each case at the operator interface, which establishes the typical distance noise. If a relatively high number of light pulses and thus points is combined in one scanning pass, this does enable usable measured values or scanning points to be obtained, for example, from weakly reflective targets, however a sufficiently dense scanning grid is thus generated at most at short range. In the case of more remote objects, in contrast, scanning points are then "missing" and/or only a very wide-meshed scanning grid is provided and the position resolution is too low to satisfactorily acquire the geometry of a respective object. Vice versa, more remote objects can also be scanned with sufficiently good resolution using a scan having analysis, for example, of each individual light pulse ("single shot"), however the mentioned problem of a poor SNR arises again, for example, with stronger intensity of the background signal or poorly reflective target objects in the scanning range.

SUMMARY

One object of some embodiments of the present invention is therefore to provide an improved optoelectronic measuring device having scanning functionality and such a scanning method.

A further object of some embodiments of the present invention is to provide an improved optoelectronic measuring device having scanning functionality and such a scanning method having improved measurement of distances according to the runtime method.

These objects are achieved by the implementation of the characterizing features of the independent claims. Features which refine the invention in an alternative or advantageous manner can be inferred from the dependent patent claims and the description, including the description of the figures. All embodiments of the invention which are illustrated or otherwise disclosed in this document are combinable with one another if not expressly stated otherwise.

Some embodiments of the invention relate to an optoelectronic measuring device having scanning functionality, for example, a ground-based and/or stationary measuring device, preferably a laser scanner, a laser tracker, a profiler, or a total station. The measuring device has a pulsed radiation source for generating a measuring beam from light pulses or light pulse sequences (bursts). The light pulses are emitted in this case at a predefined or adaptively adjusted emission rate. For example, the device has a laser source and generates laser pulses. Furthermore, the device has an optical unit for the emission of the light pulses into free space onto a target object and a beam deflection unit for variation or for pivoting of the emission direction of the light pulses at settable emission power about at least one axis, in particular about two axes perpendicular to one another, in such a manner that scanning sampling of the target object is executable, wherein a scanning grid is formed from scanning points. The variation of the emission direction by means of the beam deflector is preferably carried out in this case at least approximately constant speed or with uniform rotation. Moreover, the device has at least one angle sensor or position sensor, using which the respective present emission direction is measurable, for example, one or more angle encoders.

In addition, the device has an optoelectronic detector for the detection of light pulses reflected from the target object and a controller having analysis functionality, which is designed to measure a distance value to a respective scanning point of the target object according to the time-of-flight principle, based on a number n>=1 of detected light pulses. The control and analysis unit is moreover designed for automatically setting the number in dependence on a target-object-related measured value determined by the measuring device on location.

In other words, one or mere detected light pulses are used for determining a respective distance value, wherein the selection of how many light pulses a respective distance value is based on is determined automatically by the electronic controller of the measuring device in dependence on a measured value measured in real time or live, which is linked to the target object. There is advantageously thus not a fixed specification which is fixed beforehand with respect to the number of the light pulses on which a scanning point is based, but rather the number of the light pulses combined to form a scanning point is adapted flexibly and automatically to presently existing measuring conditions. For example, the controller having analysis functionality automatically switches over from single shot to accumulation of two or more light pulses in dependence on distance values measured in the scope of the scanning procedure as measured values, so that some scanning points of the resulting point cloud are based on one detected light pulse, but other scanning points, in contrast, are based on multiple sampling points.

The quality of the sample points, i.e., the points on the object surface, can thus advantageously be improved, for example, in that a moving average (moving mean value/average, moving average) is performed over n>=2 adjacent light pulses or measurement points, so that the number of the scanning points or 3D points on the object is thus not reduced in comparison to the light pulse number n=1 (each detected light pulse is used to determine a scanning point). Moreover, alternatively or additionally, the number of the scanning points (for example, a 3D point of the resulting 3D point cloud) can be adjusted variably and automatically to the specific measurement situation.

The target-object-related measured value is preferably a distance value to the target object, so that the number can thus be adjusted to the distance to the target object or the measuring distance. Alternatively or additionally, a signal characteristic of one or more detected light pulses is used as the measured value, in particular a signal strength or intensity or the signal-to-noise ratio (SNR) or light pulse flank steepness.

In one refinement, the control and analysis unit is designed in such a way that an automatic setting of the number of detected light pulses is carried out, in particular by means of at least one defined absolute or relative limiting value for the target-object-related measured value, in such a way that at least one first range is provided having a number increased in comparison to a second range. For example, the measured value is a distance value and the first range is provided for distance values below a maximum distance, so that, for example, for scanning points which lie outside the maximum distance, the number of the detected laser pulses on which it is based is thus one and for scanning points within the maximum distance, it is at least two. Alternatively or additionally, the measured value is a signal strength of the detected laser pulse or pulses and the first range having a relatively increased number applies to signal strengths below a limiting signal strength.

The control and analysis unit is preferably designed in this case in such a way that at least for the first range, the measurement of a respective distance value is based on averaging over a number $n>=2$ of detected light pulses, either according to the principle of the moving average, so that the number of the scanning points is independent of the set number of detected light pulses, or on the basis of averaging reducing the number of the scanning points (in comparison to the number $n=1$). I.e., multiple detected light pulses or distance values derived therefrom are each combined to form one distance value, wherein this—in comparison to a procedure without averaging—either results in a uniform scanning point number or in a reduced one. In this case, according to the invention, the number is advantageously set variably in dependence on the target-object-related measured value or depending on the range, so that, for example, in a first scanning range averaging is performed over a number $n=6$ and in a further, more remote scanning range or a scanning range having better signal strength of the detected pulses, over a number $n=2$.

In one refinement of the measuring device according to the invention, the automatic setting of the number is performed in that the detector and the control and analysis unit are designed for the detector-side summation of a number $n>=1$ of successive acquired light pulses or for the summation of light pulse sequences to form a resulting total pulse and the measurement of a distance value to the target object is performed by applying the time-of-flight principle (only) to the resulting total pulse. The summation is thus performed in general, for example, by means of multiple accumulators in the FPGA (field programmable gate array), where the received pulse signal curves are added.

In this case, the summation is optionally performed until the resulting total pulse fulfills a predefined termination or stop criterion linked to the object-related measured value, wherein, for example, the termination criterion is a signal strength threshold value to be exceeded, which is especially substrate independent background noise-dependent, and/or an error tolerance/limit to be undershot of the distance value measured based on the resulting total pulse. Alternatively or additionally, the target-object-related measured value is a distance value to the target object and the termination criterion is a sudden change of the distance measured value, wherein a sudden change is, for example, a relative change by at least 3%, 5%, or 10%. Such a sudden change indicates, for example, that a corner or edge of the object is being scanned and averaging over the corner or edge would take place due to further summation and it would therefore disadvantageously be blurred.

Alternatively to the addition of pulse signal curves, solely digital setting of the number is performed by using the distance values associated with each of the successively acquired light pulses, so that, for example, for a number $n=2$, the resulting distance value finally associated with a scanning point is thus formed from an average of two such distance values. A termination criterion as described above is also defined as an option for this alternative, so that, for example, distance values can still be used for averaging until the termination criterion is met, for example, an error tolerance for the resulting distance value. This means the setting of the number is dynamically dependent on the termination criterion.

A combination of laser pulses (i.e., a setting of the number $n>=2$) can thus be performed in different ways. On the one hand, an accumulation of the time signal acquired using an A/D converter can be performed over multiple laser pulses or laser burst sequences and a distance can be computed after completed accumulation; on the other hand, each individual time signal can be separately analyzed and an associated distance can be determined, over which the mean value is subsequently numerically formed. Averaging over multiple laser pulses does not automatically mean a reduction of the point rate in this case. By means of a "moving average", the point rate can be set as desired, for example, at the same level as the laser firing rate. This has the advantage of an angle-consistent point density, which does not result in "flawed" sampling points in particular in the case of more remote objects, i.e., prevents a very wide-meshed scanning grid and maintains the position resolution. The distance noise improves due to the averaging over multiple laser pulses or laser burst sequences and does so at all distance ranges. However, signal averaging has the disadvantage at long distances of blurring object geometries and signatures. The lateral position resolution is reduced. In contrast, if the averaging is only performed over a lateral pivot range which is not substantially greater than the lateral laser beam profile, the position resolution is maintained on the measured object. If the accumulation or the averaging of laser pulses is designed with consideration of the lateral laser beam profile as a function of the measuring distance or the distance value, an optimum position resolution can thus be achieved with the least possible distance jitter. Particularly at short range, where the angle extension of the laser beam is particularly large, it is possible to average over a very large number of laser pulses without this resulting in blurring of edges and corners of the objects to be measured.

If the laser power additionally has to be reduced for the purpose of maintaining ocular safety at short range, this can readily be implemented without the expected quality of the measurement points being reduced at the same time, since the accumulation or the averaging of laser pulses is ramped up simultaneously. This distance range, which is essential for laser safety, is called NOHD (nominal ocular hazard distance). In one refinement, the control and analysis unit is accordingly designed to automatically increase the number of detected light pulses and the reduction, which is linked and adapted thereto, of the power of the emitted measuring beam for distance values below a defined limiting distance value in comparison to distance values above the limiting distance value, in particular wherein the limiting distance value is the nominal ocular hazard distance (NOHD). In other words, the controller is designed to consider ocular safety parameters in such a way that in a defined range close to the measuring device, the number is automatically increased with automatic reduction of the emitted power of the measuring beam or the light pulses. In other words, the light power is automatically reduced in a defined range in the vicinity of the device to ensure the ocular safety and, for example, the number of the summed light pulses is increased simultaneously so that the power losses are compensated for on the detector or analysis side.

As a further option in such measuring devices according to some embodiments of the invention, multiple detector-side summation procedures of a respective number of acquired light pulses take place in parallel proceeding from different start pulses. In this case, the number is equal in all procedures or different numbers are used, wherein this can also be variably changeable. In this case, each individual detected light pulse can be used as a starting pulse of an accumulation, so that the number or the grid of the scanning points corresponds to the number or the grid, respectively, of the sampled points or, for example, every fifth, twelfth, etc. light pulse is used as the first pulse of the summation procedure.

For the case in which the target-object-related measured value is a distance value, this is optionally determined by a preceding light-pulse-based measurement. I.e., the distance value used for setting the number is measured according to the same principle or using the same means as the distance values of the scanning points. For example, in the case of line-by-line scanning sampling, the distance value is used from one of the previous scanning lines which corresponds to the emission direction adjacent to the respective present emission direction or the last known or last determined distance value is used.

Alternatively or additionally, the measuring device has an additional (rough) distance meter for measuring a distance value as the fundamental measured value for setting the number, which can determine a distance value to the target object and without disadvantages can be less precise than the distance values measured using the light pulses for this purpose. Such a distance meter for providing at least an approximate item of distance information to the target object is, for example, designed as a RIM camera, electronic distance meter (Disto), light field camera, stereo camera, or camera for distance determination by means of image processing.

The control and analysis unit is optionally designed to perform the automatic setting of the number in such a way that an at least essentially distance-independent and/or a uniform or constant scanning grid is generated by the scanning sampling. In other words, it is thus ensured that a uniform distribution of the scanning points is achieved with respect to the respective surface, for example, also independently of the distance at which a respective target object is located. This then applies either to a subsection of the scanning grid (for example, for the short range of the measurement, i.e., for example, the area of 10 m-15 m around the measuring device) or optionally for the complete scanning grid.

In embodiments in which the target-object-related measured value is a distance value to the target object, as a further option, the automatic setting of the number is performed in a manner adjusted to the effective diameter or radius of the measuring beam, wherein a distance dependence of the effective beam diameter is taken into consideration. I.e., the setting takes into consideration that the diameter of the laser measuring beam increases with the distance to the target object (i.e., because of beam divergence, the effective diameter of the measuring beam acting on the target object is dependent on the distance between measuring device and target object) and adjusts the accumulation or averaging range accordingly by means of setting of the number. This automatic setting of the number is preferably performed in such a way that averaging is only performed over laser pulses which are not located spatially farther apart than a settable overlap range of the laser beam on the object to be scanned. Since laser beams, independent of the respective focusing state, diverge at greater distances, at fixed scanning speed and fixed laser firing rate, the number of the laser pulses within the angle range spanned by the beam diameter is distance-independent from a maximum distance. It is therefore advantageous at distances shorter than this maximum distance value to adjust the number of the laser pulses and/or distances to be averaged.

As an option, the control and analysis unit is designed for automatically setting the number in such a way that the scanning grid is formed adapted to the effective radius of the measuring beam, wherein a distance dependence of the radius is taken into consideration, in particular wherein the automatic setting of the number is performed in such a way that the spacing of successive scanning points corresponds to the radius of the measuring beam or a selectable fraction or multiple of the radius of the measuring beam, at least for scanning points, the associated distance value of which is not greater than a maximum distance value. I.e., the setting takes into consideration that the diameter of the measuring beam or the radius of the light pulses changes with the distance to the target object and adjusts the scanning grid by means of setting of the number accordingly.

As a further option, the control and analysis unit is designed in such a way that a user notification is output on a user display screen before or also during the scanning procedure, wherein the user notification indicates whether a desired or specified scanning grid can be maintained for existing or selected measuring parameters, in particular light pulse emission rate, speed of the measurement axis alignment variation (pivot rate), and/or measuring range. In this case, the user display screen is either an integral component of the measuring device or is, for example, wirelessly connected thereto, for example, in the form of an external computer (tablet, etc.).

In a further refinement, the control and analysis unit is designed for also automatically setting the laser pulse emission rate in dependence on a target-object-related measured value, in particular a distance value, determined on location by the measuring device. In this case, the control and analysis unit is preferably designed to be able to identify and process multiple light pulses in the air (firing rate greater than the time-of-flight of the laser pulses) simultaneously, for example, as described in EP 3 118 651 A1 of the same applicant. This permits the laser pulse emission rate to be set independently of the laser pulse time-of-flight, which is significant in particular at long distances.

In this case, the control and analysis unit is preferably furthermore designed for automatically setting the laser pulse emission rate adjusted to the setting of the number of detected pulses in such a way that the spacing, which is dependent on the measuring beam radius, of successive scanning points is ensured independently of the distance. In other words, the automatic setting of the laser pulse emission rate is used in such a way that the laser pulse emission rate above a maximum distance value is higher than below the maximum distance value, so that the spacing of successive scanning points as much as possible corresponds to less than a settable fraction or multiple of the diameter of the measuring beam even for scanning points, the associated distance value of which is greater than the maximum distance value. This means the emission rate is preferably automatically set in such a way that, independently of the measuring distance or for the entire measuring range, it is achieved that the spacing of successive scanning points corresponds at most to the effective diameter of the measuring beam, also for distances to the target object which are greater than a critical value. For example, a limiting distance value exists at which, at the number one (i.e., each laser pulse results in one scanning point), the spacing of successively sampled points corresponds to the effective diameter of the measuring beam.

With sufficiently high laser pulse emission rate and/or low angular speed of the scanning axis (high resolution scanning setting), this limiting distance value can be infinite, which means that the scanning angle between two laser pulse emissions is less than the effective beam diameter. In this case, the number can be n>1, also for arbitrarily long distances, without edges or corners being corrupted by averaging. In any case, the measurement accuracy can be enhanced and/or the spacing of the scanning points can be reduced below the limiting distance value by increasing the number. In particular in the case of rapid scan such as overview scans, the firing rate is preferably increased above the limiting distance value and the desired above-described spacing is thus achieved.

The subject matter of some embodiments of the present invention is moreover an optoelectronic measuring method for optically sampling a target object with emission of a pulsed measuring beam onto the target object to be sampled with variation or pivoting of the emission direction of the light pulses about at least one axis, in particular two axes perpendicular to one another, in such a way that a scanning sampling of the target object is executable, wherein a scanning grid is formed from scanning points, progressively measuring the emission direction, and detecting the light pulses reflected from the target object. Furthermore, the method comprises the measurement of a distance value from a respective scanning point of the target object according to the time-of-flight principle, wherein a number $n>=1$ of detected light pulses or light emissions is used for the measurement. Furthermore, the method comprises the automatic setting of the number of the light pulses used for the measurement in dependence on a target-object-related measured value determined in real time.

Some embodiments of the present invention furthermore includes a computer program or computer data signal, embodied by an electromagnetic wave, having program code for controlling and/or carrying out the method according to the invention, in particular when the program is executed in a control and analysis unit of a measuring device according to the invention.

The measuring device according to the invention and the method according to the invention will be described in greater detail hereafter on the basis of the embodiments and application procedures schematically illustrated in the drawings.

DETAILED DESCRIPTION

Figure 1:
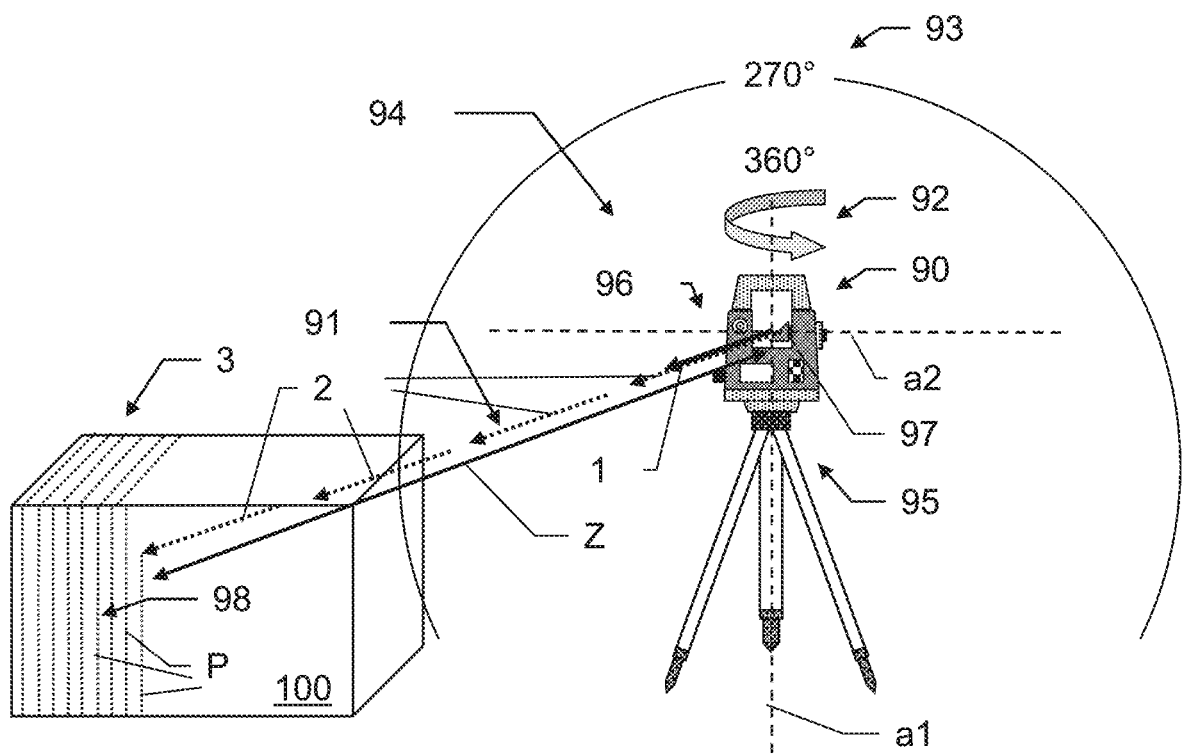
FIG. 1 shows a measuring device according to the invention.

FIG. 1 shows a stationary measuring device 90 having scanning functionality for recording object surfaces 100, for example, designed as a laser scanner. The device has an intensity-modulated, in particular pulsed radiation source (not shown), for example, a laser source, and an optical unit (not shown), so that a pulsed measuring beam 91 can be emitted into free space onto a target object 200 in an emission direction 1 (the individual pulses 2 are indicated by the individual dashed arrows), wherein the emission direction 1 defines a measuring axis and the respective present direction 1 of the emission or the measuring axis is measured by one or more position/angle detectors (not shown). The optical unit is embodied, for example, as a combined emitting and receiving optical unit or has in each case a separate emitting optical unit and receiving optical unit. In this case, light pulses reflected from the target object 100 are received by the measuring device 90 and acquired by an optoelectronic detector (not shown). In this case, for example, up to a million or more light pulses per second and thus sampling points 98 can be acquired.

For the scanning sampling of the object 100, the measuring radiation 91 or emission direction 1 is progressively pivoted and in each case at least one measured value per scanning point P is successively recorded at short time intervals, among them in any case a distance value Z to the respective scanning point P, so that a plurality of measurement directions associated with a respective scanning point P is provided and form a scanning grid 3 from a plurality of scanning points P.

In addition to the distance measured value 3, optionally, for example, a brightness or intensity value is recorded. The brightness is a grayscale value, which is determined, for example, by integration of the bandpass-filtered and amplified measuring radiation over a measuring period associated with the object point.

The pivoting is performed in this case by means of a beam deflector, as shown, for example, by an upper part 96 of the measuring device 90 being rotated step-by-step or continuously in relation to a base—relatively slowly—around a first, vertical axis a1, so that the measuring radiation 91 is pivoted in the horizontal and the plurality of emission directions 1 differ from one another in the horizontal alignment, and in that a pivotable optical component 97, for example, a pivoting or rotating mirror, is rotated—relatively rapidly—about a horizontal axis a2, so that the measuring radiation 91 is pivoted in the vertical and the plurality of emission directions 1 additionally differ from one another in the vertical alignment. The object surface 100 is thus scanned line-by-line, for example, using a line grid as shown. The scanning takes place in this case within a predetermined angle range 94, the boundaries of which are defined by a horizontal and vertical pivoting width. The angle range 94 in the horizontal is preferably 360°, i.e., a complete revolution about the vertical axis a1, and in the vertical is, for example, 270°, so that a spherical range 94 is provided, which depicts almost the entire surrounding range in all spatial directions. However, arbitrary other angle ranges 94 are also possible.

There are also implementations in which the vertical resolution is not implemented by an additional axis of rotation, but rather by multiple emitting and receiving units operating simultaneously, which have a specific constant angle offset in the vertical direction, for example, of 1°. The adjustment of the laser firing rate or the number of the measured points to be considered per scanning point is accordingly also possible here for each individual emitting-receiving unit as described here ("multibeam").

To measure the distance value Z, the measuring device 90 has an electronic controller (not shown), which comprises an analysis functionality for measuring the respective distance value Z according to the runtime principle (analysis according to the time-of-flight method), based on a number n≥=1 (n is an integer) of reflected and detected light emissions, for example light pulses or light pulse sequences. In other words, either one detected light pulse or multiple detected light pulses is/are used for determining the distance value Z.

According to the invention, this control and analysis unit of the measuring device 90 is designed in such a way that the number of the light pulses used per distance value Z or scanning point P is automatically set thereby, specifically in dependence on a measured value determined by the measuring device 90 on location and/or in real time. The measured value is linked to the target object 100 in this case.

In other words, the number of the light pulses from which a distance value Z is measured is not fixedly specified for the scanning procedure by the user, for example, but rather is adapted "live" by the controller on the basis of a presently determined measured value. This has the advantage that the number is adapted optimally to the measuring situation, for example, the distance to the target object 100 (for example, scanning or target object at short range or at long range) or the measuring signal level, and independently.

The measured value is preferably a distance value Z to the target object 100, which was measured, for example, on the basis of a previous number of detected light pulses. Alternatively, such a distance value as a measured value is determined by another measuring principle and/or an additional distance meter, for example, an electronic distance meter having substantially lower accuracy (rough distance meter), a stereo camera system, a light field camera, a RIM camera (range image camera), or a 2D camera having image processing system for distance estimation on the basis of one or more recorded 2D images (for example, on the basis of an object of known size recognized in the image). The distance value on which the automatic setting is based is thus either measured with the aid of the laser emission itself or is determined with the aid of an additional distance measuring device of the measuring device 90, which determines an approximate distance to the target object 100, for example, with an accuracy in the meter, decimeter, or centimeter range.

Additionally or alternatively, a signal characteristic of one or more detected light pulses 2 is used as the measured value for setting the number, for example, the received (relative or absolute) light pulse intensity or light pulse width. Since such signal characteristics are dependent, inter alia, on properties of the target object 100 (for example, the received light pulse intensity is dependent on the reflectivity of the target object 100), such a measured value is thus also target-object-related or linked to the target object 100.

Figure 2A:
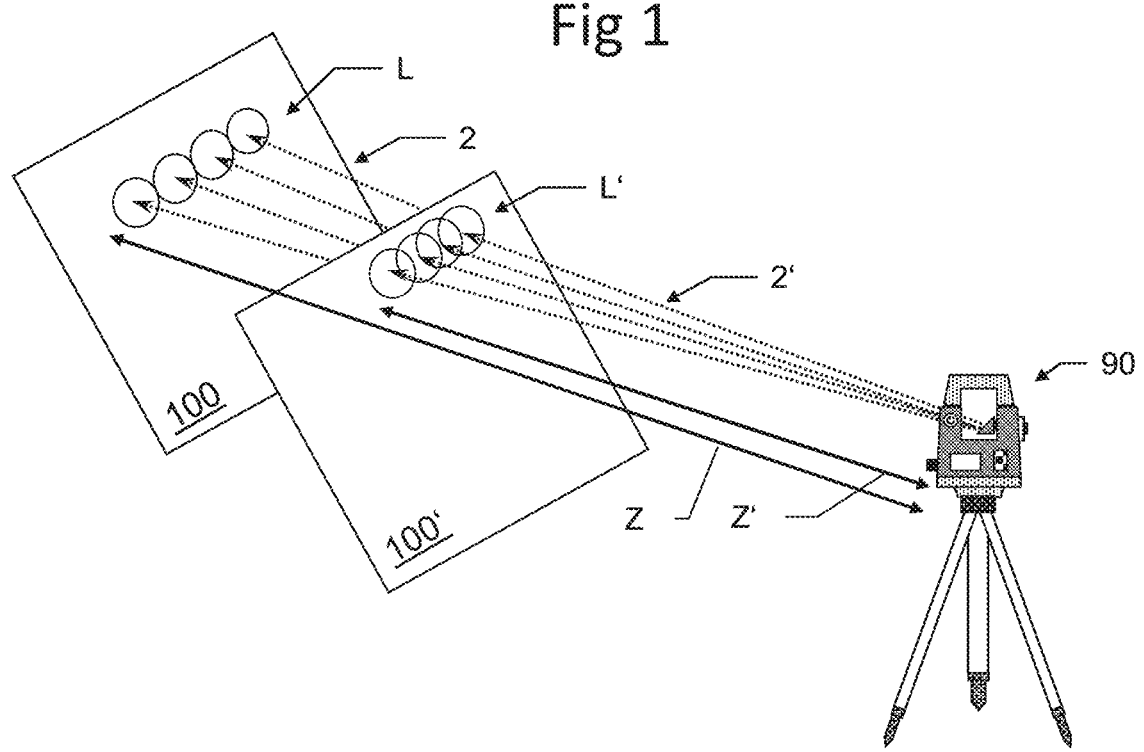
FIGS. 2a,b show the setting according to the invention of the number in dependence on a measured value.
Figure 2B:
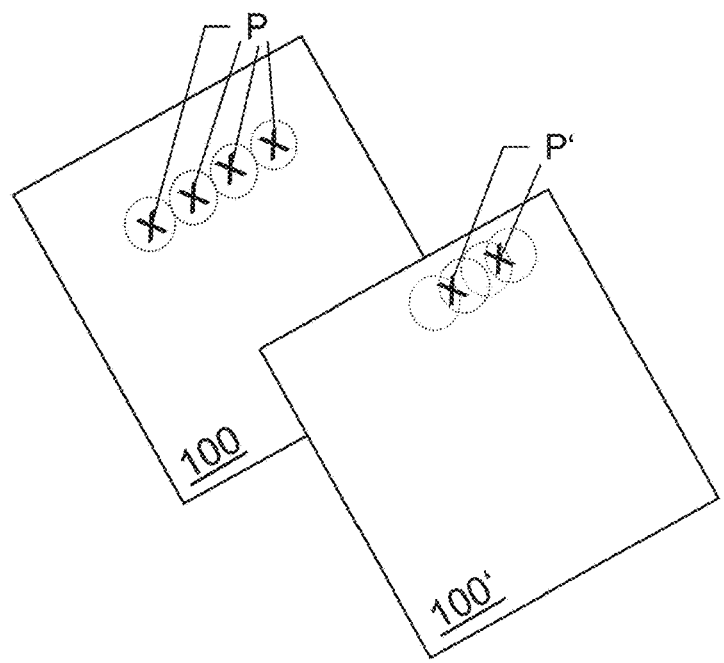

FIGS. 2a and 2b illustrate the setting according to the invention of the number of distance values used in dependence on a measured value, in the example in dependence on the distance value Z or Z', respectively. Two objects 100, 100' are shown in each case, wherein the first target object 100 is located at a greater distance Z from the measuring device 90 than the distance Z' to the target object 100', or the same target object, once at shorter distance Z' to the measuring device 90, once at longer distance Z.

FIG. 2a shows how the light pulses 2 and 2' emitted in succession by the measuring device 90 are each incident on the target object 100 or 100' as a light spot or sampling point L or L', respectively, wherein because of the pivoting or progressive change of the emission direction, the light spots L or L' are offset from one another as shown. This offset is greater at greater distance Z (at unchanged, uniform pivot speed) than at the shorter distance Z'. In the example, the target object 100' is sufficiently close to the device 90 in this case and/or the distance Z' is sufficiently short that the light spots L' overlap.

According to the invention, as shown in FIG. 2b, the number of the light pulses 2 or 2' used for measuring a distance value is now set in dependence on the distance. For the greater distance Z (i.e., for the object 100), this number is automatically set low, for example, to 1, i.e., one distance value is measured, for example, from each light pulse, or, in other words, one scanning point P having associated distance value (shown in the figure as "X") results per light pulse.

For the shorter distance Z' (i.e., for the object 100' or for the short range), the number is automatically set to 2, i.e., one distance value is formed from each two (adjacent) detected light pulses together or, in other words, one scanning point P' having associated distance value results from two light pulses. The quantity of the scanning points P, P' is reduced in this special illustrated case with respect to the object 100' in comparison to a scan without the automatic setting of the number according to the invention by the factor 2, which also causes a data reduction. The sensitivity and/or the SNR are increased simultaneously.

Such automatic setting and analysis are very possible for shorter distances Z' and/or at short range, since due to the overlap of the light spots L' or the light pulses 2', a respective light pulse 2' only provides a small amount of additional information about the object 100' and/or its distance at the respective sampling point.

Alternatively to the illustration of FIG. 2b, according to the invention, the automatic setting of the number is performed in such a way that the quantity of the scanning points P is maintained in spite of averaging, by performing the accumulation of the light pulses 2 or 2' by means of a moving random filter. In this case, for each detected light pulse 2 or 2' and/or for each measurement direction, averaging is performed in each case over the automatically set number of adjacent light pulses, for example, according to FIGS. 2a, 2b over the number two, so that one scanning point or one distance value results from each two light pulses 2 or 2', wherein each light pulse 2 or 2' is more or less used twice, once in combination with a "first" light pulse for averaging to form a "first" distance value and furthermore in combination with a "second" light pulse for further averaging to form the following "second" distance value. The averaging can also comprise a position weighting function and/or an intensity weighting in this case, for example.

As an essential advantage, this procedure according to the invention offers, on the one hand, an enhancement of the quality of the scanning points P' by reducing the distance noise. On the other hand, the amount of data of the scanning points can optionally be reduced, since the measurement points often come to rest mutually too close together at short range in any case. Moreover, a homogenization of the distribution of the scanning points P or P' can thus be achieved: due to the accumulation of two detected light pulses 2' for each scanning point P', the spacing of the scanning points P' of the object 100' in relation to one another is thus equal or at least similar to the spacing of the scanning points P of the more remote target object 100 from one another. I.e., due to the automatic setting of the number in dependence on the distance, a more uniform scanning point grid can be achieved in comparison to the prior art and/or even an optimum, uniform point grid or a scanning grid, in which the distribution of the scanning points P, P' is completely independent of the respective measuring distance Z, Z'.

Figure 3:
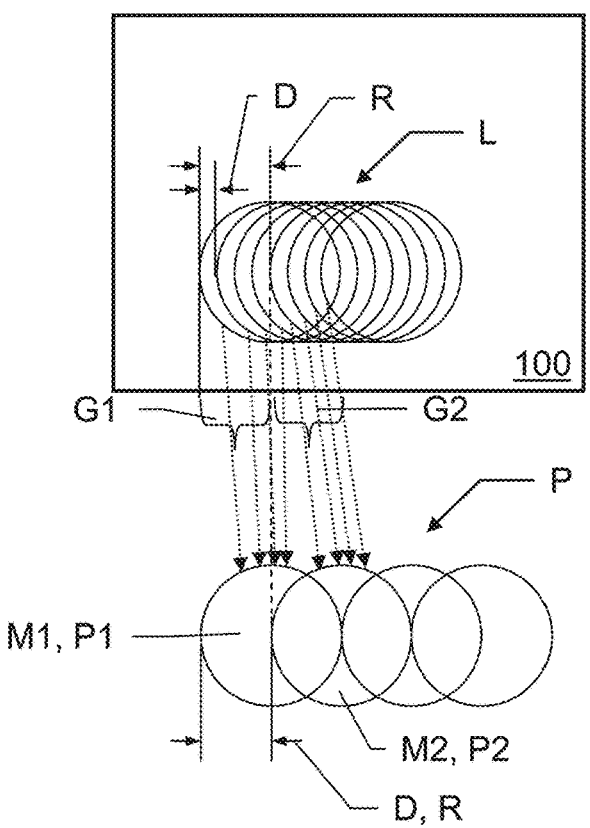
FIG. 3 shows an embodiment of the invention.

FIG. 3 illustrates a further embodiment of the invention. An object surface 100 having light spots or sampling points L of the scanning movement is shown in the upper part of the figure. The light pulses backscattered to the instrument are each detected on the optoelectronic detector. The light spots L associated with the light pulses have a radius R, which essentially corresponds to the radius of the measuring beam. The successively detected light pulses or light spots L have a spacing D from one another. This lateral spacing D is dependent on the distance from the object; the greater the distance or measuring distance, the greater the spacing D is (at constant pivot speed of the measuring beam). A constant rotation speed, in particular of the rapidly rotating axis, is advantageous, since any acceleration is linked to an increased power consumption. Since the instruments are often battery-operated, economizing the electrical power is advantageous.

It is moreover assumed in the example that the distance is comparatively short, because of which the spacing D is comparatively small and the light pulses L overlap comparatively strongly as shown (in addition to the pivot speed, of course, this is also dependent on the rate at which the light source of the measuring device emits pulse sequences or light pulses L). The control and analysis unit is advantageously designed to be able to identify and process multiple light pulses in the air simultaneously (resolution of ambiguity).

With each detected light pulse L, a distance value is measured. For example, in the case of black target surfaces having weak signal, the useful signal is very noisy, and the distance measurement is therefore of poor quality. By means of the automatically adaptive mean value filter according to the invention, in contrast, averaging is performed over adjacent distance values and the quality of the measurement result is thus improved. The filter is shifted in each case from one emission direction to the respective closest emission direction, the angle spacing of the scanning points is maintained at the same time and is distance-independent. This accumulation method reduces the distance noise substantially for each emission direction 1 (scanning point), in particular by the factor 1/square root (number).

In contrast, if the automatically adaptive mean value filter is configured in such a way that the number of the scanning points is reduced as shown in FIG. 3, the scanning grid is then reduced in dependence on the presently set number of used distance values. An unnecessarily dense scanning grid is thus prevented at short range.

In any case, according to the invention, the number of the light pulses used for the distance measurement is automatically set in the course of the automatic setting based on the knowledge of a present and/or locally measured distance value, so that at the present distance and thus the present lateral spacing D of the light pulses L from one another, each four light pulses L are summed at the detector to form a resulting total pulse G1 or G2, and then a distance value M1 or M2 is determined from a respective total pulse G1 or G2, respectively. I.e., from each four accumulated detected light pulses L, one scanning point P1 or P2 results—on the basis of the distance value M1 or M2 and the measurement of the emission direction using the position sensors. In this case, the scanning points P1 and P2 either result, as shown in FIG. 3, from different detected light pulses or partially from the same light pulses, for example, by one or two of the four light pulses L respectively being "replaced", for example.

With increasing distance from the target object 100 and thus increasing spatial spacing D of the detected pulses from one another, the number of the single pulses L is summed to form one total pulse G1, G2 is progressively reduced.

In the example according to FIG. 3, the number of the summed pulses L is selected in this case so that an optimum scanning grid results, by the spacing of the resulting scanning points P1, P2 from one another throughout being of the same size as the effective radius R of the measuring beam or a respective light pulse. An optimum coverage or scanning of the target object 100 is thus achieved. The number of the summed sampling points can be set and/or adapted depending on the application and required position resolution and sensitivity.

The summation of a respective number of pulses L to form a resulting total pulse G1 or G2 is already performed, for example, on the receiver side, for example, by the digitized pulses being accumulated in samples as time signals. Only the entirety of the respective number of accumulated or added pulses is then supplied to an analysis to determine a distance value. In other words, the time-of-flight measuring principle is first applied to the provided total pulse G1 or G2. One advantage of the combination of a number of pulses to form a respective total pulse G1 or G2 already on the detector is that even with very noisy signals, i.e., a poor SNR, an analyzable (total) pulse can still be reconstructed, since the noise occurs in a chronologically uncorrelated manner, but the successive laser pulses L occur in a reproducible manner.

The distance value used by the control and analysis unit for automatically setting the number results, for example, from a preceding number of detected light pulses L and/or of adjacent light pulses L. In the present example, the distance value determined from the total pulse G1 is thus used as the basis for the setting of the number of the following light pulses L (in the example, the number is fixed at four on the basis of the distance value on the basis of the total pulse G1). Alternatively, for example, the last but one measured distance value is used or, with line-by-line sampling of the object with slow pivoting of the vertical axis a1 (see FIG. 1), the distance value associated with identical setting of the vertical axis a1 for the previous or one of the previous scanning lines.

For point cloud analysis programs, it can be advantageous if the scanning points lie on a regular angle grid. The reduction of the number of the points as shown in FIG. 3 is then not desired. To maintain the number of the scanning points, and to nonetheless increase the number of the laser pulses to be averaged at short range, i.e., with decreasing distance from the object, moving averaging (moving average) is applied. In this case, the received and ADC-converted time signals are again accumulated in samples, wherein multiple such parallel accumulators are now activated in the FPGA, which each accumulate with a time delay by one emission cycle. In the example of averaging over four emission sequences, the first accumulator thus relays the summed time signal to the distance analysis unit after, for example, a number of four laser emissions, during the next emission cycle, the second accumulator then supplies its summed time signal, then the next accumulator, and so on. The number of the scanning points is thus maintained, i.e., each full 360° revolution of the scanning movement has an equal number of scanning points, and nonetheless the noise quality of the point cloud and the sensitivity of the scanner are substantially improved. Instead of the optimum scanning grid, the optimum selection of the filter length is used here, i.e., the optimum selection of the number of the summed laser emissions L. The number is optimally selected when the summation takes place essentially over single pulses L, which are placed transversely to the emission direction 1 (see FIG. 1) within a beam radius R. Blurring of the object structures is thus prevented.

Figure 4A:
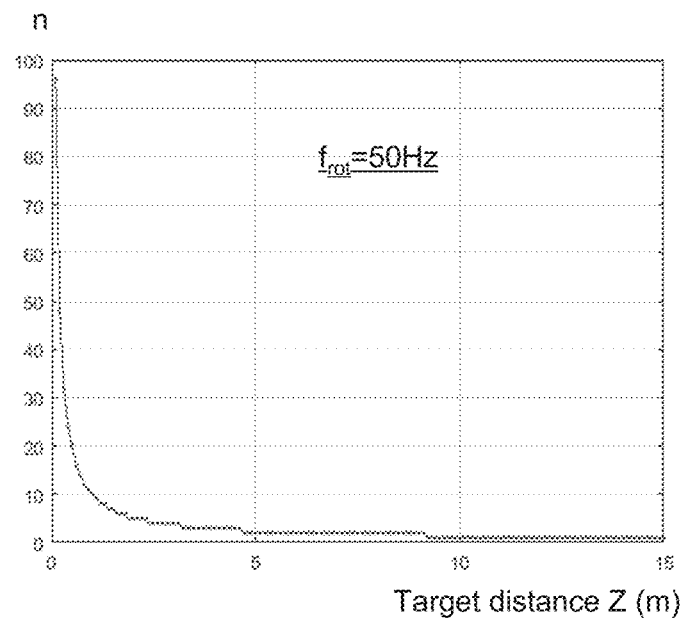
FIGS. 4a,b show two examples of a distance-value-dependent setting of the number n of the light, pulses.
Figure 4B:
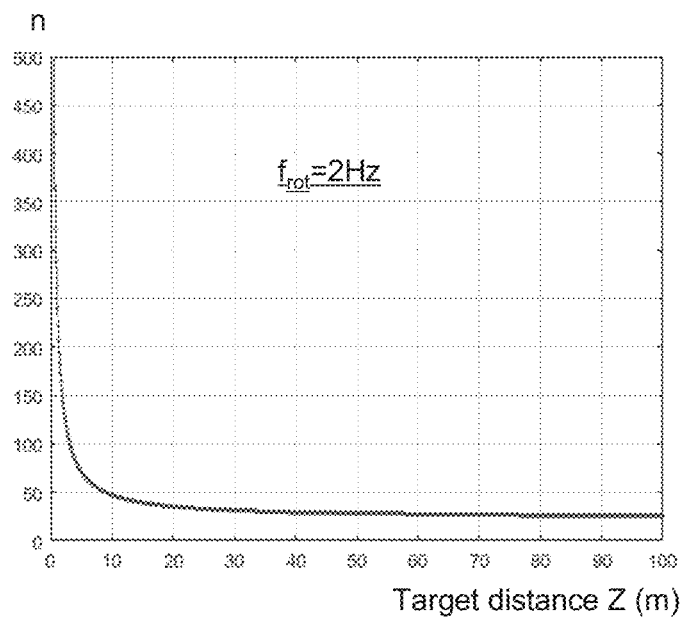

FIGS. 4a and 4b show two examples of a distance-value-dependent setting of the number n of the light pulses, on which the measurement of a distance value according to the ToF principle is based. The distance to the target object in meters is indicated on the abscissa, and the number n automatically set depending on the distance is indicated on the ordinate. The differences result because of different scanning parameters for the measuring device: in the first example according to FIG. 4a, 50 Hz is assumed as the rotation rate for the pivoting of the emission direction, and 2 Hz is assumed in the second example according to FIG. 4b, with equal emission rate of the laser pulses to one another. Because of the substantially lower pivot speed in the second example of FIG. 4b, a substantially higher number of pulses can be used for an optimum measurement, result, for example, approximately 50 pulses instead of only one or two pulses at a distance of approximately 10 m. As a first optimization criterion for determining the number n, the latter is selected in such a way that blurring, i.e., smoothing of edges and corners, does not occur on the object structures to be measured. The measuring beam moves by precisely one laser beam radius within a number n. Of course, the criterion "laser beam radius" can also be configured by the user himself. A multiplication factor of the laser beam radius or in addition a weighting of the signal strength or the SNR can be used as a criterion.

The uniformity of the generated spot grid can be used as a second optimization criterion, i.e., for example, in such a way that the spot grid is selected independently of the measuring distance (criterion), and the number of the accumulations n is selected as sufficiently large that one distance value Z is measured in each case during the further movement by the radius of the light pulse or measuring beam. I.e., the point grid corresponds to the radius of the light pulse, as shown in FIG. 3.

The diagrams result in this case in the following manner:

The smallest possible spot grid $D_P$ (spacing of the sampled spots) is specified by the axis rotational speed and the light firing rate of the measuring device:

$$D_P = 2 \pi Z f_{rot}/f_s$$

where $f_{rot}$: rotation frequency of the beam deflection unit or the pivoting; $f_s$: light firing rate; distance value Z.

If maintaining the object structures is essential as an optimization criterion for determining the number n, the moving accumulation of the received signals or the moving average of the individual distance measurements comes to bear. No smoothing of edges and corners occurs if the maximum number n of light emission sequences lies within, for example, the laser beam radius R:

$$n = (R f_s)/(2 \pi Z f_{rot})$$

The optimal number n is thus proportional to the laser firing frequency and inversely proportional to the object distance Z. Of course, the number n can also be occupied with further criteria such as the intensity or the SNR, so that deviations from this formula occur. With sufficiently good reflection signals, n can be selected as less than the limiting value specified in the formula.

For the case of data reduction by means of combination of a number of n light emission pulses to form one or a few scanning points, the measurement point grid results through accumulation or averaging from multiple individual measurements and thus from a multiple of the smallest-possible point grid $D_P$:

$$D = n \, D_P$$

The scanning grid is reduced in this case in relation to the measurement grid $D_P$ by a factor n. If the slow pivot axis is simultaneously accelerated by the factor n orthogonally to the fast pivot axis, the point grid remains locally regular and the effective amount of data is reduced by the square of the factor n.

The lateral distance D of the final scanning points can also be compared to the effective measuring beam radius R; the factor k is defined as follows in this case:

$$D = n \, D_P = k \, R$$

wherein for the sake of simplicity, the number n is still used as a freely selectable parameter. The factor k gives information about the setting of the scanning point grid in relation to the effective measuring beam radius R, wherein with assumption of an emission beam focused at infinity. the effective measuring beam radius R results as follows in dependence on the measuring distance Z and divergence angle θ from the original measuring beam radius $R_0$:

$$R = R_0 + Z \tan(\theta)$$

The following point grids result for various numeric values k:

k<1 The point grid set by means of n is smaller than the radius of the light beam on the measured object. A further increase of the number n of accumulated laser pulses is still possible without causing blurring of the measurement data.

k=1 The point grid corresponds to the effective radius of the light beam.

k=2 The point grid corresponds to the effective diameter of the light beam. Depending on the structure of the measured object and the laser beam profile, with activated accumulation of laser pulses, slight worsening of the lateral object resolution could occur.

k>2 The point grid is larger than the diameter of the light beam; the lateral position resolution can be visibly reduced with laser firing accumulation.

If the final point grid D is set equal to the measuring beam radius R, then k=1 and the following results from $D = n \, D_P = k \, R$:

$$n \, Z \, 2 \, \pi f_{rot}/f_s = R_0 + Z \tan(\theta)$$

and thus:

$$n = [R_0 + Z \tan(\theta)]/[Z \, 2 \, \pi f_{rot}/f_s]$$

which corresponds to the optimum number n of light emission sequences to be averaged. In the above formula, it can be that n<1. However, if n is nonetheless set to greater than 1, this can result in worsening of the lateral object resolution.

The performance increase and/or the reduction of the distance noise is proportional to the square root of the accumulations sqrt(n); in this case, the optimum n for distances $Z < R_0/\tan(\theta)$ increases inversely proportional as the distance becomes less. The right term $R_0/\tan(\theta)$ represents the characteristic limiting distance Zc.

At distances Z, which are substantially greater than $Zc = R_0/\tan(\theta)$ (i.e., the light beam radius on the target object $R \gg R_0$ and $R_0$ is thus negligible), the optimum number of the accumulations is:

$$n = f_s \tan(\theta)/[2 \pi f_{rot}]$$

The optimum number n is distance-independent in this distance range Z>Zc.

In this example, for example, for a pivoting frequency $f_{rot}=50$ Hz, the optimum number of accumulations results as: n=1, for $f_{rot}=2$ Hz, in contrast, the optimum number n=24 and overall the curve shown in the graphs of FIGS. 4a, 4b.

Figure 5A:
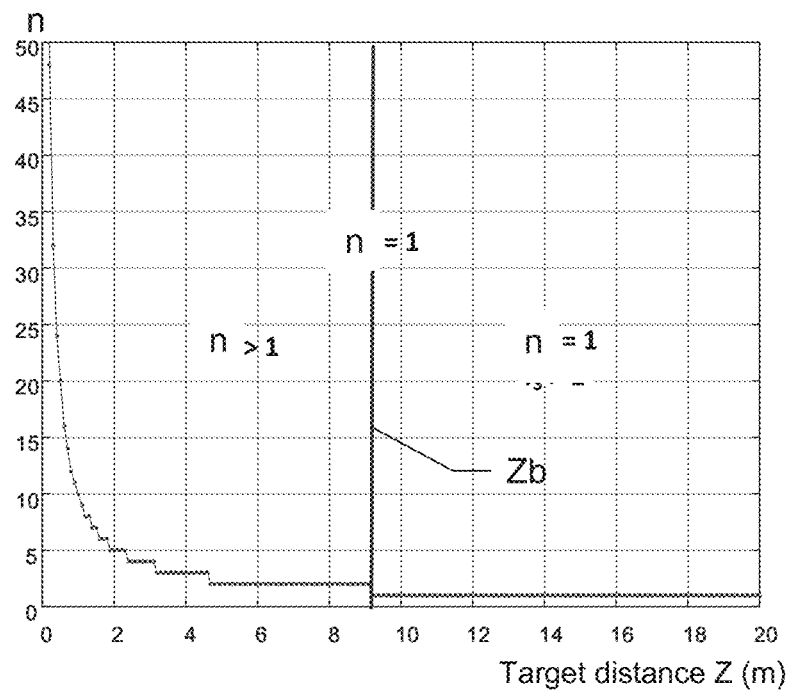
FIGS. 5a,b show a limiting case of the automatic setting of the number.

The limits of the automatic adaptation of the number of the accumulations are shown in FIG. 5a. The limiting case is the case that n=1, i.e., one distance value is obtained from each individual light pulse. At distances Z of the target object less than the maximum distance Zb to the target object corresponding to this number, according to the invention, the measurement point quality is improved by increasing the number n, i.e., n>1. With a moving average filter, the angle point grid is maintained at the same time. In contrast, with the alternative scanner setting, in which n distance measurements are each combined to form one measurement point, the scanning point grid is kept constant.

Figure 5B:
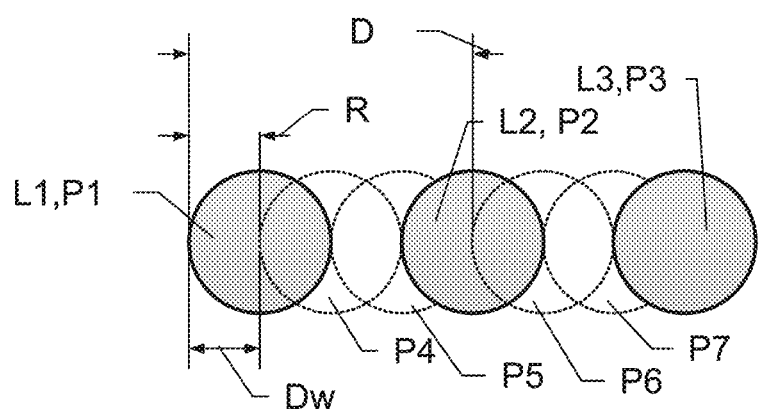

At distances Z greater than this limiting or maximum distance Zb, it is neither possible to improve the measurement point quality nor to maintain a constant scanning point grid. It is only still possible to keep the scanning point angle grid constant, i.e., as with conventional laser scanners. In FIG. 5b, a portion of such a scanning grid for distances Z to the target object greater than the limiting distance Zb is shown (Z>Zb). A scanning grid would be optimum and/or desirable in which the spacing of the scanning points Dw corresponds to the light pulse radius R. The light pulses L1, L2, and L2 actually have the spacing D from one another and thus the distance values or scanning points P1, P2, and P3 derived therefrom also do (since n=1; one distance value is measured from each detected light pulse). As already mentioned, with sufficiently high laser firing rate $f_s$ or slow deflection speed $f_{rot}$, the limiting or maximum distance Zb can be infinite, so that the optimum number of the accumulations is greater than 1 at all distances Z.

As an option, according to the invention, the measuring device or a user unit connected thereto, for example, also designed for the remote control of the measuring device, such as a tablet or smart phone, has a user display screen and the control and analysis unit is designed to display a warning on the display screen if a selected or specified scanning grid cannot be maintained using the selected scanning settings such as firing rate, pivot rate, or measuring distance. The user can thus react and, for example, change the measurement parameters accordingly.

In one refinement according to the invention, the control and analysis unit of the measuring device is alternatively or additionally designed to automatically set not only the number of the light pulses L1-L3 used for a scanning point P1-P3, but rather moreover also to adjust the emitted light pulse rate. In the example, the laser firing rate is automatically increased for distances Z greater than the maximum distance value Zb, specifically in such a way that the additional scanning points P4, P5, P6, P7 result and the desired optimum scanning grid is thus generated. The measuring device can thus automatically optimize the scanning grid independently of the user, and can do so even for longer measuring ranges.

Alternatively or additionally to a distance-value-dependent setting of the pulse emission rate, such a setting is performed in dependence on a signal characteristic of the detected light pulses. For example, if a weak pulse intensity is detected, the emission rate is automatically increased, so that, for example, the number of the summations can thus be set higher.

As a further alternative or addition, the control and analysis unit is designed to take into consideration ocular safety parameters. Since in particular at short range, i.e., within a few meters around the measuring device, an increase of the number n is by all means possible, as is apparent from FIGS. 4a, b, this is used to reduce the power of the measuring radiation or per light pulse at the same time and thus to ensure ocular safety. In other words, at short range, for example, the intensity per light pulse is reduced, but at the same time by increasing the number of the summed pulses, a total pulse is generated at the receiver by means of accumulation which (approximately) has the same intensity as the light pulses outside short range, therefore a consistency of the signal level is thus achieved over the entire measuring range, wherein the requirements, for example, for the laser safety can be met more easily by the reduction of the power of the individual pulses. These requirements are high especially at short range because of increasing radiation strength and longer dwell time of the light spot on the eye of an observer, so that the present invention offers particularly many advantages here.

FIGS. 6a-6d show an example of automatic setting according to the invention of the number based on a signal strength as the measured value. FIGS. 6a-d each illustrate the accumulated time signal curve 5 (time curve of the amplitude of the received signal I) from a number n of light pulses detected using the detector, wherein in FIG. 6a, the number n is equal to one, in FIG. 6b it is equal to two, in FIG. 6c it is equal to three, and in FIG. 6d it is equal to four.

Figure 6A:
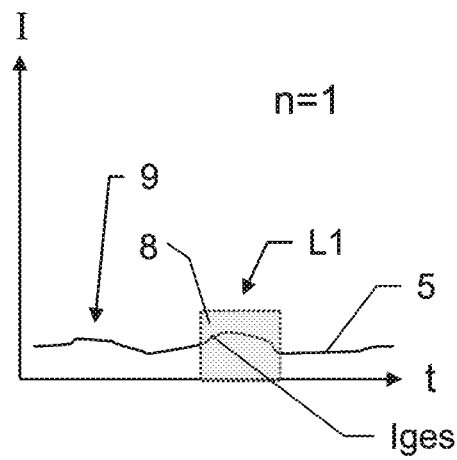
FIGS. 6a-d show an example of an automatic setting according to the invention of the number based on a light pulse characteristic, and FIGS. 7a,b show further refinements of the invention having multiple parallel accumulations.
Figure 6B:
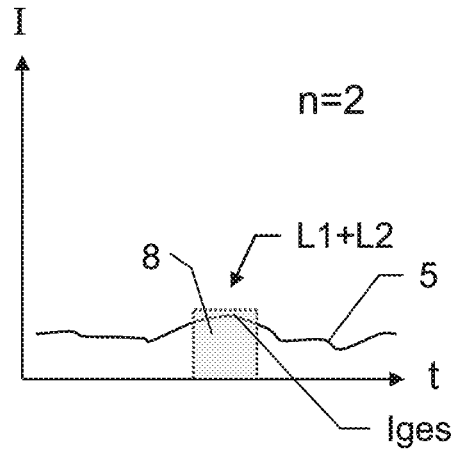
Figure 6C:
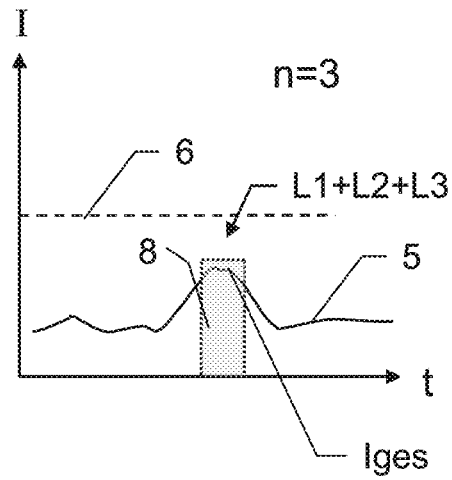
Figure 6D:
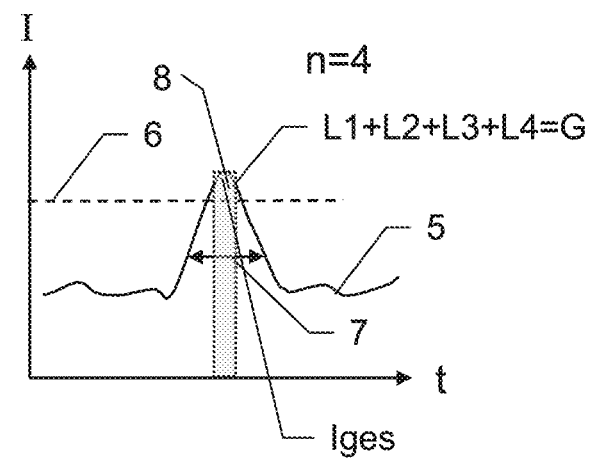

FIG. 6a shows the detection of the first light pulse L1. Because of the signal noise 9, it or its intensity $I_{ges}$ can hardly be made out. In FIG. 6b, the signal level 5 after detection of the following light pulse L2 is shown, wherein the signal $I_{ges}$ was added to that of the preceding one of FIG. 6a. This was continued for the two following light pulses L3 and L4 (FIG. 6c and FIG. 6d). Since the successive light pulses L1-L4 are not randomly distributed over time in contrast to the noise component 9, but rather are correlated, the total pulse signal $I_{ges}$ "grows" more and more and stands out more and more from the noise component 9. According to the invention, for example, the signal strength $I_{ges}$ of the detected (total) pulse is now used for automatically setting the number.

In the example, a signal strength threshold value or intensity threshold value 6 is defined for this purpose. The summation of the light pulses L1-L4 is performed until this threshold value 6 is reached or exceeded. This is not the case in the situation of FIG. 6c, because of which the summation is continued and the next detected light pulse L4 is also used. A signal level of the total pulse G is thus achieved which exceeds the threshold value 6 (FIG. 6d). The signal strength threshold value 6 is in this case an absolute, fixedly specified value or is set in dependence on the determined noise level 9, for example, to ensure a minimal SNR. In other words, the threshold value 6 represents a criterion which establishes when the summation is ended. The setting of the number of the light pulses used for the distance determination is thus dependent on a stop or termination criterion which is to be met. The minimum SNR specified in this case can be established, for example, by a required maximum tolerated distance jitter.

Alternatively or additionally, the pulse width 7 is used as such a criterion as in FIG. 6d. The summation or accumulation of the detected signals or light pulses is performed until the resulting pulse width 7 reaches a specified value.

As a further alternative, the ratio between pulse flanks steepness and signal amplitude of the total pulse can be used as the criterion. The summation or accumulation of the detected received signals is performed until the ratio reaches a previously determined, optionally distance-dependent value.

As a further alternative or addition, the accuracy of the distance value measured according to the runtime principle from the detected pulses L1, L2, L3, L4 is used as the termination criterion. Because of the high level of fuzziness 8 of the pulse L1 (FIG. 6a), a distance value results which is subject to a relatively high level of uncertainty. The fuzziness 6 and thus the measurement uncertainty or measurement jitter of the distance value decrease progressively with increasing number n. In FIG. 6d, the fuzziness 8 is relatively small and the error of the distance value is therefore also small. As soon as this error or this uncertainty undershoots a defined limit, the summation is ended and the number is not increased further, but rather the determined distance value is saved as the final measurement result and a new scanning point or a further distance value is determined. It can be shown that with random noise, the measurement uncertainty or the measurement jitter of the distance value behaves inversely proportional to the pulse flank steepness. The parameters SNR and pulse flank steepness are thus, in addition to the target distance and signal intensity, further characteristic variables or signal characteristics for determining and/or automatically setting the number n.

Alternatively or additionally to these termination criteria, an upper limit for the number is optionally established as a further termination criterion, from which no further summation is performed, independently of whether one of the first termination criteria is met or not. For example, if the threshold value 6 is still not reached after a specific, specified number of detected pulses, the summation on the detector is nonetheless terminated, if possible, a distance value is measured and/or a scanning point is determined from the total pulse G achieved up to that point, and the next summation is started.

As a further alternative or additional stop criterion, with which the number is set, a comparison of successive measured distance values is used. In this case, a distance value is derived from each detected light pulse L1-L4. As soon as a significant difference is established between these distance values, the summation is stopped. This is because a sudden change of the distance value, for example, by a value of 10 mm or more, indicates, for example, a corner or edge of the target object, so that it is not reasonable to combine further pulses to form a distance value or scanning point, but rather it is terminated and a new accumulation is started.

In addition to these examples shown, alternatively the setting of the number n can also be performed in dependence on more than one target-object-related measured value, for example, in dependence on a distance value and the signal intensity, so that, for example, for a specific measuring range, i.e., an interval of defined distance values, a relatively small number, for example, one or two light pulses can be used as the number, unless a low signal intensity is measured, which is below an established minimum intensity, for example. The number is then automatically increased, either up to a certain threshold value or until a termination criterion is met or up to a fixed number. For example, the number is thus set to 8 pulses instead of to two or increased until a sufficient signal intensity of the resulting total pulse is established. Thus, for example, weakly reflecting target objects can be measured with reduced measurement uncertainty, more strongly reflecting targets at the same distance range, in contrast, with enhanced resolution (higher number of scanning points per unit of area, due to a smaller number of summed light pulses).

Figure 7A:
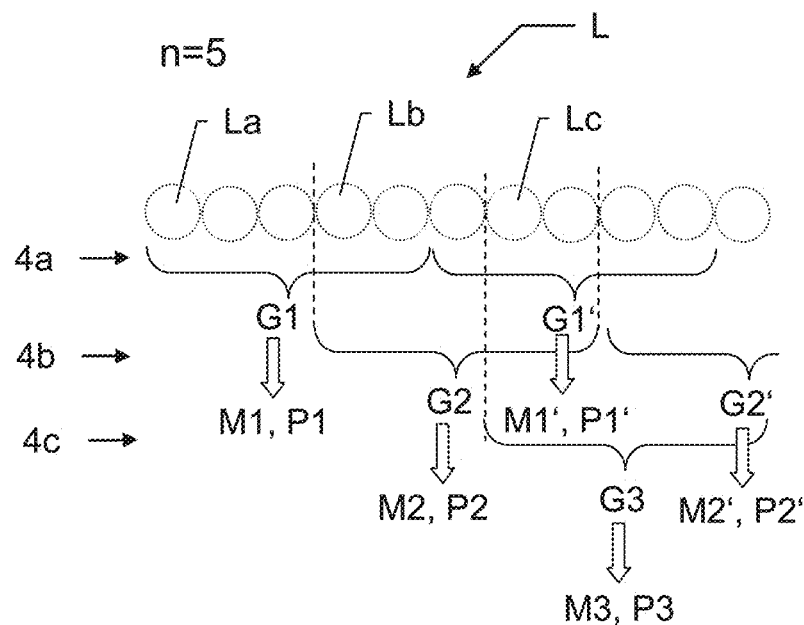

FIGS. 7a, b show a further refinement of the invention. In this case, the control and analysis unit of the measuring device is designed in such a way that multiple summations 4a, 4b, 4c occur offset and in parallel. In this example, the number n of the light pulses used for a respective distance value is equal to five in each case.

FIG. 7a shows how, proceeding from a first starting pulse La, the first sequence 4b of summations is started, so that from the first five successive light pulses including the starting pulse La, a first total pulse G1 results, based on which a first distance value M1 is determined by runtime measurement. The second total pulse G1' and second distance value M1' result from the five following light pulses, etc. In parallel thereto, proceeding from the second starting pulse Lb (which is the fourth detected light pulse proceeding from the first starting pulse La), a second summation procedure 4b is started, which results in the total pulse G2 and following this G2', etc., wherein five pulses are also accumulated here in each case. Finally, proceeding from a third starting pulse Lc, a third sequence 4c of summations is carried out, resulting in the total pulse G3, etc. Based on these total pulses G1-G3, the measured distance values M1, M2, M1', M3, M2' etc. are thus provided and thus, together with the associated direction information about the direction of the measurement axis or light pulse emission, the sequence of the corresponding scanning points P1, P2, P1', P3, P2'.

These partially-overlapping parallel procedures offer the advantage, inter alia, that smoothing is achievable over the sampled points. The number n can also vary for respective summation procedures running in parallel, so that, for example, a first procedure 4a has a measured-value-dependent first number n and a second procedure 4b has a second measured-value-dependent number, for example, 3n, wherein additional criteria such as the occurrence of a corner or edge can be taken into consideration, as described above. The number of the accumulations is furthermore optionally automatically set in dependence on the light spot size or effective radius or distance, so that, for example, for smaller laser spots or greater distances, a changeover is automatically made from the illustrated number five to the number of four or fewer. This can take place successively so that, for example, in a first range, which is closest to the measuring device, the number five is provided, while in an adjoining, somewhat more remote range, the number four, etc. down to the reduction of the number to one in an outermost range.

Figure 7B:
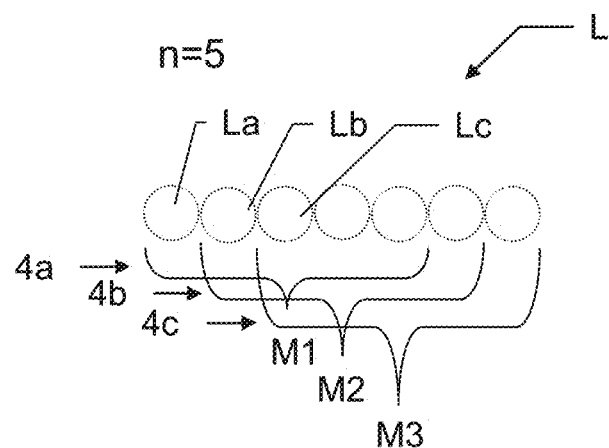

As an option, according to the invention, each individual one of the successive sampled points or detected light pulses is used as a starting point in this case, as shown in FIG. 7b, so that the greatest possible overlap is provided. Each of successive light pulses La, Lb, Lc are the starting point of an averaging here, the light pulse La for the sequence 4a, light pulse Lb for the sequence 4b, light pulse Lc for the sequence 4c, etc. From the first number of five light pulses proceeding from the light pulse La, the first distance value M1 results, from the second number of the second sequence 4b, the second distance value M2 results, etc. I.e., in each case the first light pulse of one sequence 4a-4c is replaced by the respective next light pulse, the averaging window is "shifted forward" by one pulse each time, the averaging window moves over the pulse sequence. Smoothing is thus generated with maximally dense scanning grid.

Alternatively, moving averaging can be derived solely digitally from the distances determined from individual light pulses. In this case, a distance is computed separately from each light pulse. These distances can then be aggregated to form scanning points depending on the user configuration, i.e., also corresponding to a moving average filter. This offers the advantage of increased sensitivity while simultaneously maintaining a high or not reduced point density.

It is apparent that these illustrated figures only schematically illustrate possible exemplary embodiments. The various approaches can also be combined with one another according to the invention and with measuring devices and measuring methods of the prior art.

What is claimed is:

1. An optoelectronic measuring device comprising:
   a pulsed radiation source generating a measuring beam from light pulses at a light pulse emission rate;
   an optical unit which emits the light pulses into free space onto a target object;
   a beam deflector which varies the emission direction of the light pulses about at least one axis so as to perform a scan sampling of the target object, wherein a scanning grid is formed from scanning points;
   at least one position or angle sensor for measuring the emission direction;
   an optoelectronic detector which detects light pulses reflected from the target object;
   a control and analysis unit which measures a distance value from a respective scanning point of the target object according to the time-of-flight principle, wherein a number (n, where n>=1) of detected light pulses is used for the measurement,
   wherein the control and analysis unit automatically sets the number (n) of the light pulses depending on at least one target-object-related measured value determined by the measuring device in real time, wherein one of i) or ii):
   i) the target-object-related measured value is a distance value from the target object, which was determined by a preceding light-pulse-based measurement using the distance value from one of the preceding scanning lines which corresponds to the emission direction adjacent to the respective present emission direction; or
   ii) the measuring device has a rough distance meter for determining a rough distance value from the target object and wherein the control and analysis unit is designed to automatically set the number (n) depending on a distance value measured by the rough distance meter, and
   wherein the control and analysis unit is designed for the automatic setting of the number (n) such that the scanning grid is formed adapted to the effective radius (R) of the measuring beam, wherein a distance dependence of the effective radius (R) is taken into consideration at least for scanning points, the associated distance value of which is not greater than a maximum distance value.

2. The measuring device according to claim 1, wherein the target-object-related measured value is a distance to the target object or is a signal characteristic of one or more detected light pulses.

3. The measuring device according to claim 1, wherein the control and analysis unit is designed in such that the number (n) of light pulses used is automatically settable such that at least one first scanning range is provided having an increased number (n) in comparison to a second scanning range.

4. The measuring device according to claim 3, wherein the control and analysis unit is configured such that at least for the first scanning range, the measurement of a respective distance value is based on an average over a number n>=2 of light pulses, by either:
   the principle of moving averaging, such that the number of the scanning points is independent of the set number of light pulses, or
   averaging reducing the number of the scanning points.

5. The measuring device according to claim 1, wherein the automatic setting of the number (n) is performed by the detector and the control and analysis unit is configured for the detector-side summation of a number n>=1 of successively detected light pulses to form a resulting total pulse and measuring a distance value from the target object by applying the time-of-flight principle to the resulting total pulse.

6. The measuring device according to claim 5, wherein the summation is performed until the resulting total pulse fulfills a specified termination criterion linked to the target-object-related measured value.

7. The measuring device according to claim 5, wherein multiple detector-side summation procedures of a respective number of detected light pulses from different starting pulses take place in parallel.

8. The measuring device according to claim 1, wherein the control and analysis unit is configured to automatically increase the number (n) of light pulses used for the reduction, which is linked and adapted thereto, of the power of the emitted measuring beam for distance values below a defined limiting distance value in comparison to distance values above the limiting distance value.

9. The measuring device according to claim 1, the control and analysis unit is configured to:
   automatically set the light pulse emission rate in dependence on a target-object-related measured value determined by the measuring device in real time, or
   outputting a user notification on a user display screen, wherein the user notification indicates whether a desired scanning grid can be formed for the present measuring parameters.

10. The measuring device according to claim 1, wherein the control and analysis unit is configured for automatically setting the light pulse emission rate adapted to the setting of the number (n) of light pulses used such that the measuring-beam-radius-dependent spacing (D) of successive scanning points is ensured independently of distance.

11. An optoelectronic measuring method for optically sampling a target object, the method comprising:
   emitting a pulsed measuring beam onto the target object to be sampled with variation of the emission direction of the light pulses about at least one axis, such that scanning sampling of the target object is executable, wherein a scanning grid is formed from scanning points;
   measuring the emission direction;
   detecting light pulses reflected from the target object; and
   measuring a distance value from a respective scanning point of the target object according to the time-of-flight principle, wherein a number (n, where n>=1) of detected light pulses is used for the measurement,
   wherein the number (n) of the light pulses used for the measurement is automatically set in dependence on a target-object-related measured value determined in real time, wherein one of i) or ii):
   i) the target-object-related measured value is a distance value from the target object, which was determined by a preceding light-pulse-based measurement using the distance value from one of the preceding scanning lines which corresponds to the emission direction adjacent to the respective present emission direction; or ii) the measuring device has a rough distance meter for determining a rough distance value from the target object and wherein the control and analysis unit is designed to automatically set the number (n) depending on a distance value measured by the rough distance meter, and wherein the control and analysis unit is designed for the automatic setting of the number (n) such that the scanning grid is formed adapted to the effective radius (R) of the measuring beam, wherein a distance dependence of the effective radius (R) is taken into consideration at least for scanning points, the associated distance value of which is not greater than a maximum distance value.

12. A computer program, which is stored on a non-transient machine-readable carrier, having program code, for controlling and/or carrying out the method according to claim 11.

* * * * *